United States Patent
Wu et al.

(10) Patent No.: US 7,276,818 B1
(45) Date of Patent: Oct. 2, 2007

(54) ENERGY-SAVING DRIVE APPARATUS FOR DC LOADS

(76) Inventors: Chun-Liang Wu, No. 23, Hongchang 3rd St., Taoyuan City, Taoyuan County 330 (TW); William F. Polley, 1532 Buccaneer Ct., Marco Island, FL (US) 34145

( * ) Notice: Subject to any disclaimer, the term of this patent is extended or adjusted under 35 U.S.C. 154(b) by 0 days.

(21) Appl. No.: 11/785,263

(22) Filed: Apr. 17, 2007

(51) Int. Cl.
*H02J 9/02* (2006.01)

(52) U.S. Cl. .................................... 307/157

(58) Field of Classification Search ............... 307/157, 307/154, 149, 11
See application file for complete search history.

(56) References Cited

U.S. PATENT DOCUMENTS 5,510,974 A * 4/1996 Gu et al. ..................... 363/134

* cited by examiner

*Primary Examiner*—Shawn Riley

(74) *Attorney, Agent, or Firm*—Rosenberg, Klein & Lee

(57) ABSTRACT

Energy-saving drive apparatus for DC loads including a blocking oscillator, an amplifier, an AC-DC-converter, a voltage comparator, a current comparator, and a signal feedback circuit. The DC power produced by all kinds of batteries pass through the blocking oscillator and the amplifier to obtain an amplified signal voltage that is then converted into DC voltage and current. Meanwhile, the voltage comparator and the current comparator are connected at an output terminal of the AC-DC-converter. The signal feedback circuit obtains a load signal voltage from the load. After a feedback operation, a comparison voltage and a comparison current are transmitted to the input terminal of the voltage comparator and the current comparator. After the different signal voltages and currents are compared, analyzed, edited and sorted, a constant voltage circuit between the load and the voltage comparator as well as a constant current circuit between the load and the current comparator give out a corrected constant voltage value and a corrected constant current value, respectively, for re-driving the load. Therefore, the voltage and current impedance of the load can be matched to each other by the correcting process of the signal voltage and current for achieving an optimal and efficient power-saving output state.

3 Claims, 2 Drawing Sheets

ENERGY-SAVING DRIVE APPARATUS FOR DC LOADS

BACKGROUND OF THE INVENTION

1. Field of the Invention

The invention relates to an energy-saving drive apparatus for DC loads, and more particularly to an energy-saving drive apparatus that ensures a full use of power by the control of an energy converter for achieving the energy-saving effect.

2. Description of the Related Art

Both the light energy and the electric energy are indispensable for the modern life. For example, the outdoor Christmas lamps require an electric cord for transmitting the electric energy to the lamps for lighting purpose. Moreover, many objects in our daily life also require electric energy. They are ready and practical for indoor use when they are connected via electric cords to mains socket. To the contrary, they can be problematic when used outdoors since they require a very long extension cord. Among these objects, they may require a mini motor as drive source. It is a time-wasting and labor-wasting task to establish an electric connection between the mini motor and the mains socket by the electric cord. Besides, the electric cord will destroy the appearance of the environment.

Therefore, many products are designed in such a way that they are driven by batteries. However, the batteries have the restricted service life. When they are used as power source for feeding current to loads like the outdoor lighting source, mini motor, etc. the battery will rapidly be exhausted. This does not meet the economic benefit. However, there are many loads that are used outdoors and driven by low voltage and current. To fit them with an energy-saving drive circuit for minimizing their loss and achieving the power-saving effect will meet the requirement of economic benefit no matter if primary, secondary or solar batteries are used as power source. In this way, a convenient, safe, and eco-friendly use is guaranteed.

For example, the semiconductor diode is one of the basic components in the electronic system. Its application scope can range from simple to complicated field. The rectifying function of the household appliances, for instance, is achieved by the one-way on-state function of the diode. Besides, the back light module of mobile phones and LCDs, the outdoors Christmas light, advertising board, traffic light, etc. make use of LEDs. Therefore, the LED becomes a very important light-emitting apparatus. In addition, LEDs have the advantages of small volume, low power consumption and prolonged service life. In near future, the LEDs may replace the conventional bulbs as lighting source.

However, high temperature will be created when LEDs light up for a long time, thereby affecting the luminance (Lu). Previously, the way to light up the LEDs is to directly feed the DC current to the LEDs. Thereafter, the LEDs give out visible light when excited. LEDs are mainly made of GaAsP or GaP. The wavelength and the color of the emitting light is different depending upon material used. For example, the LEDs made of GaAsP emit the red light while the LEDs made of GaP emit light in color between yellow and green. As shown in FIG. 1A, the luminous intensity of the light emitted by LEDs is directly proportional to their on-state current. Thus, as shown in FIG. 1B, the luminance (Lu) is adjustable according to the input low (L) DC current (I) or the input high (H) DC current (I). However, high temperature will be created in a short time by lighting up LEDs for a long time. Accordingly, the luminance of LEDs will be lessened when a suitable cooling device is not available, thereby reducing their operational reliability.

Furthermore, some DC loads like mini-motors used as power source for certain products don't achieve the expected power efficiency since the DC power source can't ensure a voltage and current impedance matching of the load at the output terminal according to the load features for minimizing the loss.

How to resolve the problems of the above-mentioned DC loads like lighting sources or mini-motors is the main topic of the invention.

SUMMARY OF THE INVENTION

It is a primary object of the invention to eliminate the above-mentioned drawbacks and to provide an energy-saving drive apparatus for DC loads that includes an energy converter. Under the control of the energy converter, the load terminal obtains a feedback signal. Meanwhile, the signal voltage and current are unceasingly corrected according to the load feature in such a manner that the loads can also be driven under the state of low voltage and low current. In this way, an energy-saving, safe and eco-friendly usage is ensured. In addition, the overheat problem can be avoided.

In order to achieve the above-mentioned object, an energy-saving drive apparatus for DC loads in accordance with the invention includes a blocking oscillator, an amplifier, an AC-DC-converter, a voltage comparator, a current comparator, and a signal feedback circuit. The DC power produced by all kinds of batteries pass through the blocking oscillator and the amplifier to obtain an amplified signal voltage that is then converted into DC voltage and current. Meanwhile, the voltage comparator and the current comparator are connected at an output terminal of the AC-DC-converter. The signal feedback circuit obtains a load signal voltage from the load. After a feedback operation, a comparison voltage and a comparison current are transmitted to the input terminal of the voltage comparator and the current comparator. After the different signal voltages and currents are compared, analyzed, edited and sorted, a constant voltage circuit between the load and the voltage comparator as well as a constant current circuit between the load and the current comparator give out a corrected constant voltage value and a corrected constant current value, respectively, for re-driving the load. Therefore, the voltage and current impedance of the load can be matched to each other by the correcting process of the signal voltage and current for achieving an optimal and efficient power-saving output state.

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 1A:
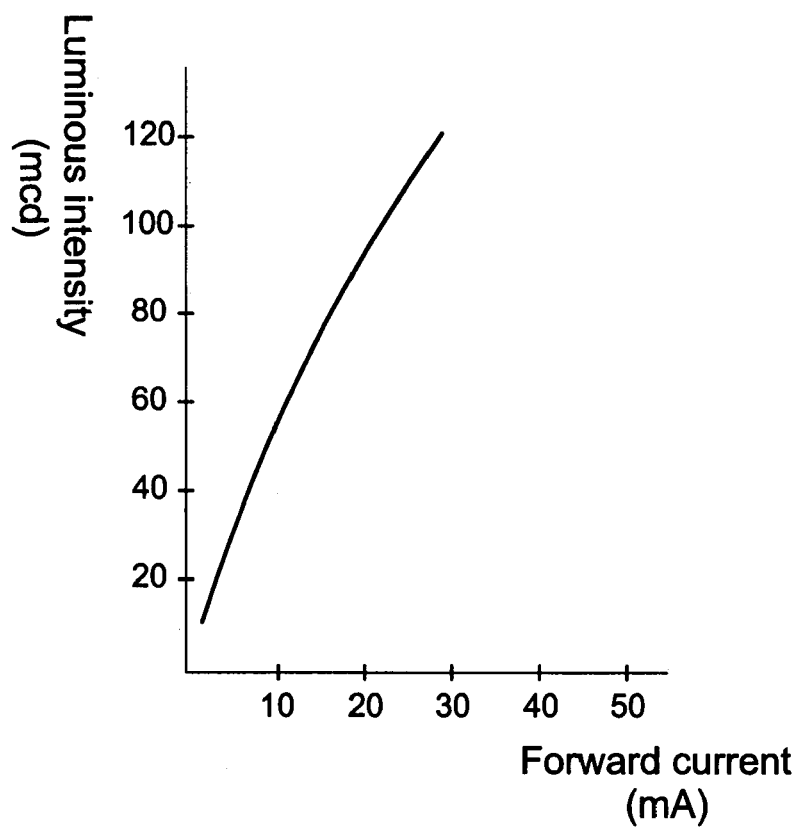
FIG. 1A is a relationship between the luminance and the forward current of a conventional LED in a diagram.
Figure 1B:
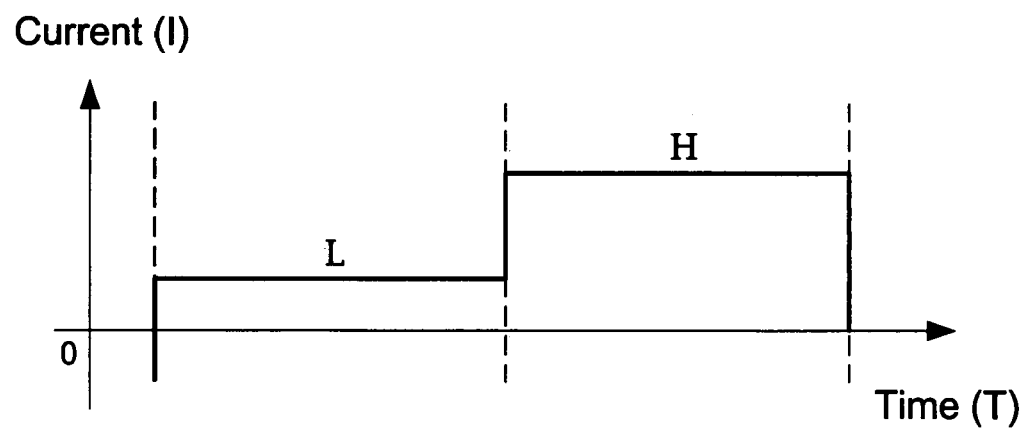
FIG. 1B is a relationship between the current and the time of a conventional LED in a diagram.
Figure 2:
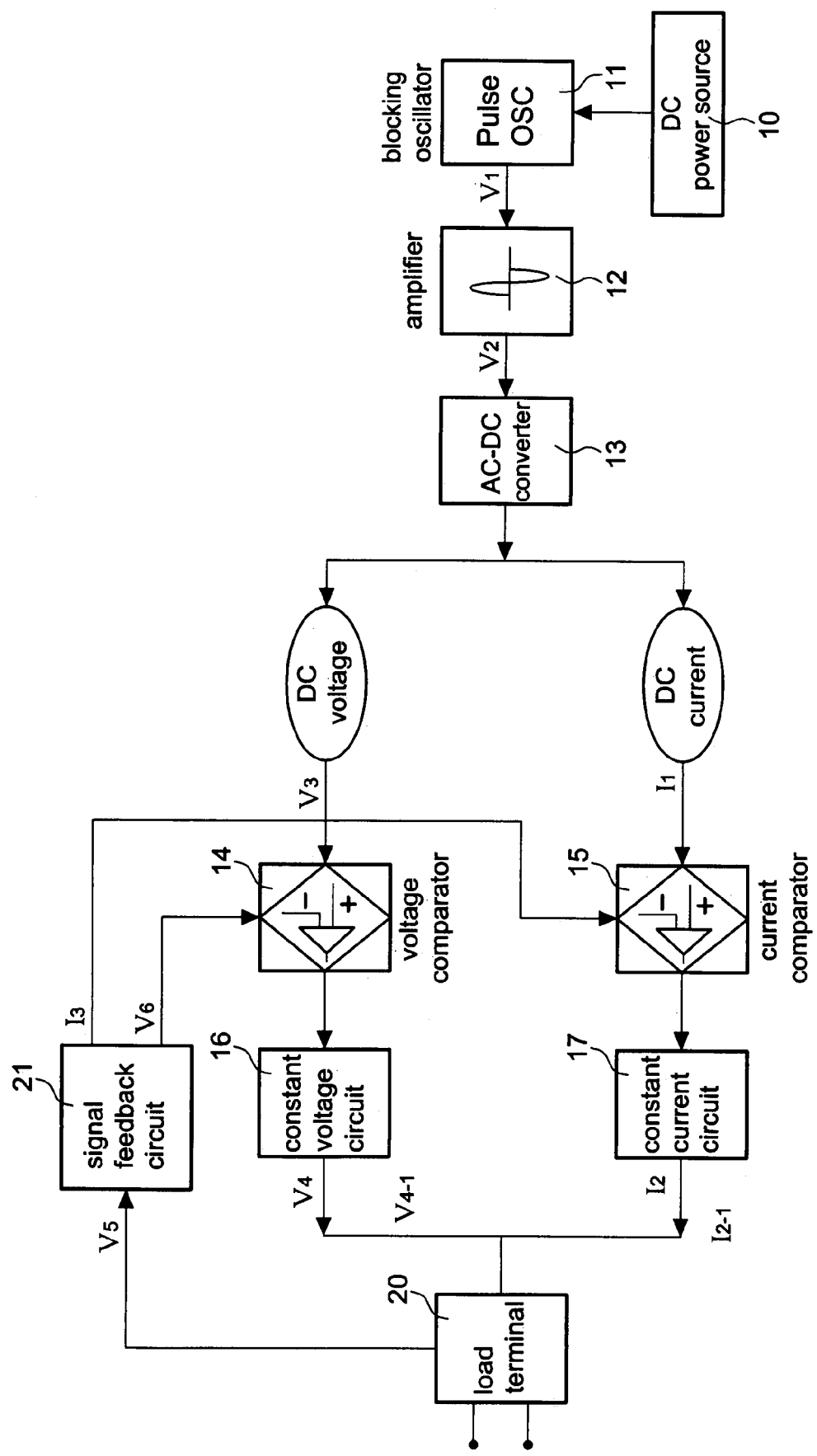
FIG. 2 is a schematic drawing of the structure of the invention.

First of all, referring to FIG. 2, an energy-saving drive apparatus in accordance with the invention includes a DC power source 10 for supplying a DC voltage to a DC load 20;

a blocking oscillator 11 for converting the electric current inputted from the DC power source 10 into a pulse signal voltage $V_1$; an amplifier 12 connected at an output terminal of the blocking oscillator 11 for amplifying the pulse signal voltage $V_1$ so as to obtain an amplified signal voltage $V_2$; an AC-DC-converter 13 connected at an output terminal of the amplifier 12 for converting the amplified signal voltage $V_2$ into an initial DC voltage $V_3$ and an initial DC current $I_1$; a voltage comparator 14 connected at an output terminal of the AC-DC-converter 13 for comparing the inputted initial DC voltage $V_3$ with the voltage signal at another output terminal and for supplying a constant voltage $V_4$ to the load; a current comparator 15 connected at an output terminal of the AC-DC-converter 13 for comparing the inputted initial DC current $I_1$ with the current signal at another output terminal and for supplying a constant current $I_2$ to the load; and a signal feedback circuit 21 interposed between the load 20 and the voltage comparator 14 as well as between the load 20 and the current comparator 15. The signal feedback circuit 21 obtains a load signal voltage $V_5$ from the load. After a feedback operation, a comparison voltage $V_6$ and a comparison current $I_3$ are transmitted to the input terminal of the voltage comparator 14 and the current comparator 15. After the different signal voltages $V_3$, $V_6$ and currents $I_1$, $I_3$ are compared, analyzed, edited and sorted, a constant voltage circuit 16 between the load 20 and the voltage comparator 14 as well as a constant current circuit 17 between the load 20 and the current comparator 15 give out a corrected constant voltage value $V_{4-1}$ and a corrected constant current value $I_{2-1}$, respectively, for re-driving the load 20. Therefore, the voltage and current impedance of the load 20 can be matched to each other by the above-mentioned correcting process of the signal voltage and current for achieving an optimal and efficient power-saving output state.

The DC power source 10 is selected from a group consisting of primary batteries, secondary batteries, and solar batteries.

The load 20 is selected from a group consisting of a DC mini-motor and a lighting source.

A comparison of the drive apparatus in accordance with the invention and a conventional drive apparatus applied to a white LED was made and the results are shown in the following table.

|  | Conventional drive apparatus | | Drive apparatus in accordance with the invention | |
|---|---|---|---|---|
| 0.05 W 5ø/8ø/10ø | 20~25 mA | | 5~6 mA | |
| 1W | 350 mA | | 30 mA | |
| Luminance | high | | high | |
| Heat (being given off) | high | | low | |
| Starting operation voltage | 3.0~3.6 V | | 1.2~2.4 V | |
| Number of required batteries | More than 2 pcs. (3 V is reached only under connection in series) | | 1 piece | |
| Number of LEDs in parallel | 1 piece | | 1~100 pcs. | |
| Hours of use (calculated by battery capacity of 2100 mA) | 0.05 W 20~25 mA 1 W 350 mA | 84~105 hrs. 6 hrs | 0.05W 5~6 mA 45 mA | 350~420 hrs Ca. 47 hrs |

It is apparent from the table shown above that the hours of use for the conventional drive apparatus depend on the number of LEDs in parallel. The more LEDs are connected in parallel, the less the hours of use are. To the contrary, the required amperage stays unchanged when 1 through 100 pieces of LEDs are connected in parallel. It means that more power can be saved when the load is increased.

In addition, the corrected constant voltage value $V_{4-1}$ and the corrected constant current value $I_{2-1}$ can be obtained by the feedback comparison for re-driving LED load. The correction operation of signal voltage and current permits a higher lighting efficiency of LEDs, that is, the efficiency can reach up to 95% through 99%. Accordingly, a great number of LEDs can be driven for lighting under the state of low voltage and current. In other words, a voltage and current impedance matching at the load terminal according to the load features of the applied products is ensured for minimizing the loss and, therefore, achieving an optimal and efficient power-saving output state. It means that more power can be saved when the load is increased. Moreover, the low operation voltage and the low power consumption solve the cooling problem. Meanwhile, a safe and eco-friendly use can be ensured.

In a similar way, the energy-saving drive apparatus of the invention can be also applicable to products other than LEDs, such as DC mini-motor, etc. Based on the above-mentioned function features, the input operation voltage and the output amperage can be regulated according to the load features for achieving the energy-saving effect. Details thereof won't be described more in the following text.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An energy-saving drive apparatus for DC loads, comprising:
    a) a DC power source for supplying a DC voltage to a DC load;
    b) a blocking oscillator for converting the electric current inputted from the DC power source into a pulse signal voltage $V_1$;
    c) an amplifier connected at an output terminal of the blocking oscillator for amplifying the pulse signal voltage $V_1$ so as to obtain an amplified signal voltage $V_2$;
    d) an AC-DC-converter connected at an output terminal of the amplifier for converting the amplified signal voltage $V_2$ into an initial DC voltage $V_3$ and an initial DC current $I_1$;
    e) a voltage comparator connected at an output terminal of the AC-DC-converter for comparing the inputted initial DC voltage $V_3$ with the voltage signal at another output terminal and for supplying a constant voltage $V_4$ to the load;
    f) a current comparator connected at an output terminal of the AC-DC-converter for comparing the inputted initial DC current $I_1$ with the current signal at another output terminal and for supplying a constant current $I_2$ to the load; and
    g) a signal feedback circuit interposed between the load and the voltage comparator as well as between the load and the current comparator, the signal feedback circuit obtaining a load signal voltage $V_5$ from the load, wherein, after a feedback operation, a comparison voltage $V_6$ and a comparison current $I_3$ are transmitted to the input terminal of the voltage comparator and the current comparator, and after the different signal voltages $V_3$, $V_6$ and currents $I_1$, $I_3$ are compared, analyzed, edited and sorted, a constant voltage circuit between the load and the voltage comparator as well as a constant current circuit between the load and the current comparator give out a corrected constant voltage value $V_{4-1}$ and a corrected constant current value $I_{2-1}$, respectively, for re-driving the load, whereby the voltage and current impedance of the load can be matched to each other by the correcting process of the signal voltage and current for achieving an optimal and efficient power-saving output state.

2. The energy-saving drive apparatus for DC loads as recited in claim 1 wherein the DC power source is selected from a group consisting of primary batteries, secondary batteries, and solar batteries.

3. The energy-saving drive apparatus for DC loads as recited in claim 1 wherein the load is selected from a group consisting of a DC mini-motor and a lighting source.

* * * * *